(No Model.)
H. P. JONES.
ROCK DRILL.
No. 502,565. Patented Aug. 1, 1893.
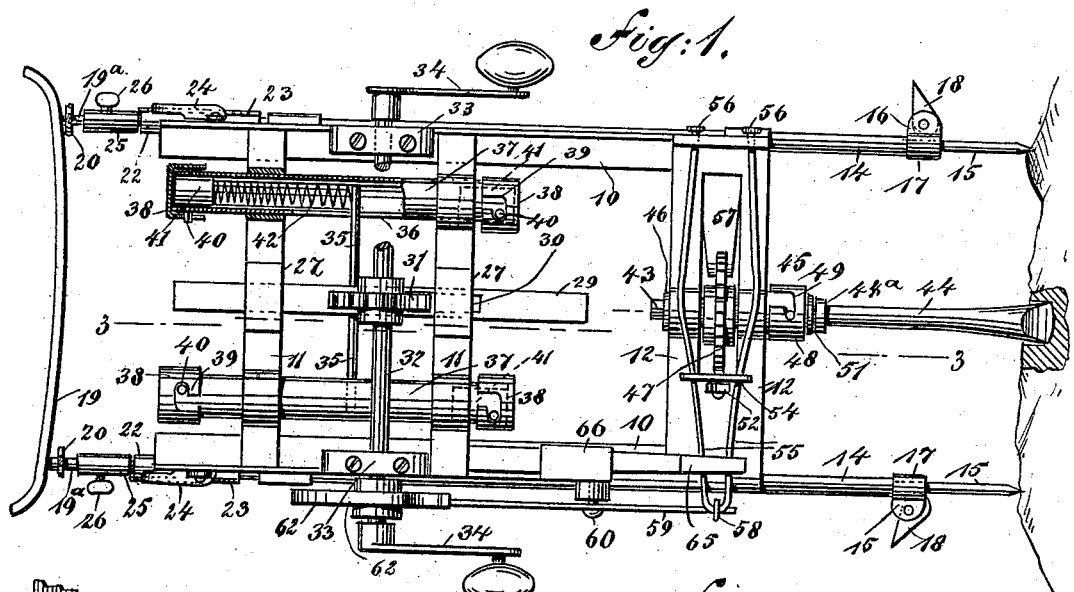
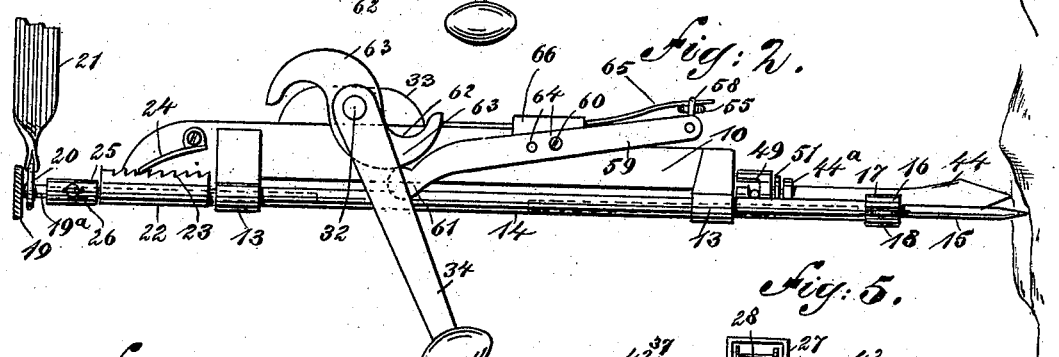
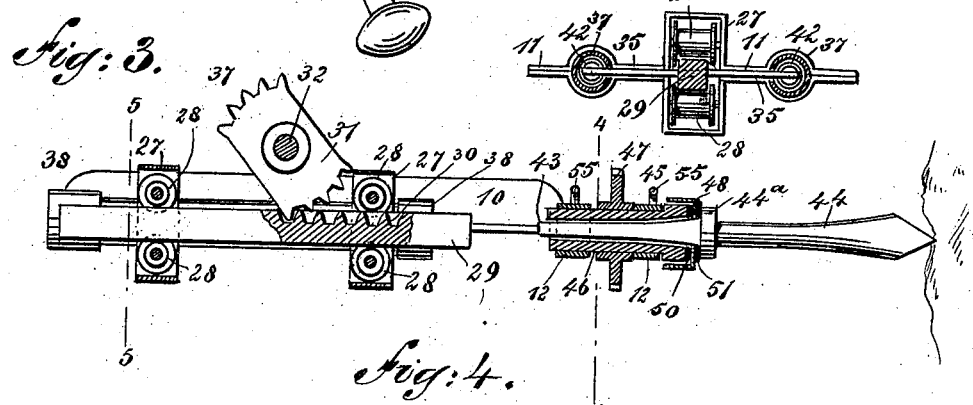
WITNESSES:
Chas Nield
C. Sedgwick
INVENTOR
H. P. Jones
BY Munn & Co.
ATTORNEYS.

UNITED STATES PATENT OFFICE.

HARVEY P. JONES, OF DENVER, COLORADO.

ROCK-DRILL.

SPECIFICATION forming part of Letters Patent No. 502,565, dated August 1, 1893.

Application filed September 21, 1892. Serial No. 446,369. (No model.)

*To all whom it may concern:*

Be it known that I, HARVEY P. JONES, of Denver, in the county of Arapahoe and State of Colorado, have invented a new and Improved Rock-Drill, of which the following is a full, clear, and exact description.

My invention is an improvement in the class of rock drills which are adapted to be held at any desired angle and operated by hand or power, as preferred, and have also an automatic feed.

My improvement is embodied in the construction, arrangement, and combination of parts hereinafter described, and more specifically indicated in the claims.

Reference is to be had to the accompanying drawings forming a part of this specification, in which similar figures of reference indicate corresponding parts in all the views.

Figure 1 is a plan view, partly in section, of the machine. Fig. 2 is a side elevation with the guard in section. Fig. 3 is a longitudinal section on the line 3—3 in Fig. 1. Fig. 4 is a cross section on the line 4—4 in Fig. 3; and Fig. 5 is a detail cross section through the spring barrels and hammer on the line 5—5 in Fig. 3.

The machine has a frame which is preferably rectangular and consists of parallel side pieces 10 and connecting cross bars 11 and 12, the latter being placed close together near the forward end of the frame, so as to form convenient supports for the drill holder, as hereinafter described. The side pieces 10 are preferably of angle iron, and secured to them near the corner of the frame and on the under side, are keepers 13, which slide upon tubes 14, and the latter are longer than the machine frame and serve as tracks on which the frame may slide. At the forward ends of the tubes 14 are rods 15 which are held in the tubes and which may be adjusted longitudinally, the rods being capable of forward extension so as to form continuations of the tracks, and the rods have pointed front ends so that they may be held firmly against the rocks. The front ends of the tubes 14 are provided with collars 17 having projecting ears 16, and between these ears are pivoted cam levers 18 which are adapted to impinge upon the rods 15 when the levers are turned forward, and by this means the rods may be held in any desired position.

At the rear end of the machine is a curved guard 19 against which the operator may press so as to hold the frame in position for work, and the guard is secured to rods 19ᵃ which project into the rear ends of the tubes 14. On the rods 19ᵃ and adjacent to the guard are links 20 to which is secured a strap 21 and the latter may be placed upon the shoulder of the operator so as to assist in supporting the machine.

The tubes 14 have at their rear ends sleeves or collars 22 which are rigidly secured to them, and the collars have ratchet teeth 23 thereon which lie next the side pieces 10 of the frame, and the teeth are engaged by spring pawls 24 which are secured to said side pieces. By this arrangement the recoil of the frame, acting on the ratchet teeth, causes the frame and drill to be fed forward as hereinafter described.

The distance that the rods 19ᵃ project into the tubes 14 is limited by collars 25 which are secured to the rods by set screws 26, as shown in Figs. 1 and 2. The cross bars 11 of the machine frame have centrally formed therein keepers 27, and in these keepers near opposite ends are journaled grooved anti-friction rollers 28 between which the hammer or rammer 29 slides. This hammer consists of a flat bar of metal preferably of rectangular cross section and on its upper side the hammer is provided with teeth 30 which are adapted to engage the teeth on diametrically opposite sides of the mutilated gear 31 which is carried by the driving shaft 32, and the latter extends transversely across the machine, being held to turn in suitable bearings 33 and has cranks 34 at the ends by which it is turned. It will be understood however, that a driving pulley may be substituted for the cranks, and power applied to the machine, without departing from the principle of the invention.

It will be seen by reference to Fig. 3, that the revolution of the crank shaft 32 will cause the teeth on opposite sides of the gear to engage the teeth of the hammer or rammer, and the hammer will thus be twice moved in the same direction by a single revolution of the gear, the opposite movement of the hammer being imparted by spiral springs as described below. On opposite sides of the hammer are arms 35 formed by fastening a rod in the hammer, and these arms have their outer ends held to slide in longitudinal slots 36 in spring barrels 37 which are arranged on opposite sides of the hammer. Each spring barrel has a removable cap 38 at each end, the caps being held in place by ordinary bayonet locks, consisting of a curved slot 39 in the cap and an engaging pin 40 on the spring barrel to enter the slot. In each end of each spring barrel is a cushion 41 and spiral springs 42, and held within the barrels and between the cushions are the arms 35. The cushions serve to prevent the springs from breaking, and they also act as insulators to prevent the electric current, generated by the working of the machine, from being transmitted to the springs and crystallizing them. The front cushions serve the purpose of insulators and also absorb the shock produced when the arms 35 strike against them.

The hammer 29 reciprocates longitudinally of the machine, as described, and it strikes upon the inner end or shank 43 of a drill 44 which is held in alignment with the hammer by a drill holder 45. The cutting portion of the drill may be of any shape desired, and on the drill near the drill holder is a fixed collar 44ª which receives the pressure of the machine frame and assists in throwing back the frame by the recoil of the drill. The drill holder has a central sleeve 46 in which the shank 43 of the drill is held loosely and on this sleeve is secured a ratchet wheel 47 by means of which the drill is turned after each blow of the hammer upon it. At the outer end of the sleeve is a cap 48 which is secured to the sleeve by a bayonet lock 49 like the locks of the same character described above, but other forms of locks may be used for attaching the cap and also for attaching the caps to the spring barrels.

The cap 48 fits snugly upon the shank 43 of the drill and the drill shank should be flattened on at least one side, so that the cap when turned will turn the drill, but this arrangement will not interfere with the free sliding movement of the drill. On the outer and inner sides of the cap are elastic washers 50 and 51 which are preferably of rubber, and these serve as insulators to prevent the electric current generated by the machine from being transmitted to the frame, and they also prevent excessive shock.

The ratchet wheel 47 of the drill holder is engaged by a hook-shaped pawl 52 which has side flanges 53 to prevent it from slipping off the face of the ratchet wheel. This hook is secured to a yoke 54 which is arranged at right angles to the plane of the ratchet wheel, and the ends of the yoke are secured to the opposite members of the forked lever 55 which extends transversely across the front end of the machine frame. The forked lever 55 is secured at one end to the machine frame, as shown at 56, it is centrally springy to permit of the necessary movement and the free end of the lever, which is also the bent or doubled end, is provided with a hook 58 which engages an oscillating lever 59, the latter being fulcrumed, as shown at 60, on one of the side pieces 10 of the machine frame.

The rear end of the lever 59 is rounded, as shown at 61, and engages an S-shaped cam 62 which is carried by the driving shaft 32. The convex portion 63 of this cam will alternately engage the rear end of the lever 59 when the driving shaft is revolved, and consequently the lever will be tilted and the drill turned twice at every revolution of the shaft; that is, after every stroke of the hammer.

The turn of the drill is effected as follows:— When the convex portion 63 of the cam 62 passes over the end 61 of the lever 59, it depresses said rear end of the lever, thus raising the front end and lifting the free end of the forked lever 55. The latter pulls upward on the hook shaped pawl 52 and this turns the ratchet wheel 47, drill holder 45, cap 48, and the drill 44. The lever 59 is provided with a plurality of holes 64 through which the fulcrum pin may be passed, and this enables any desired amount of throw to be given to the lever so that the drill may be turned any necessary distance. The return movement of the pawl 52 and the levers 55 and 59 is effected by a lever spring 65 which is secured to a support 66 on the main frame and which presses downward on the free end of the lever 55. The ratchet wheel is prevented from turning in the wrong direction by a spring detent 57.

The operation of the machine is as follows:— The drill is placed in the drill holder 45 and the operator then places the strap 21 over his shoulders, raises the front ends of the rods 15 which have been properly adjusted, and places them against the wall or rock to be drilled, and the point of the drill will also rest against the rock. The operator then grasps the handles of the cranks 34 and turns the crank shaft 32. As the shaft turns, one side of the gear 31 will first engage the teeth of the hammer 29, thus pulling back the hammer against the tension of the springs 42 which will press forward upon the hammer arms 35. As soon as the teeth 31 are turned out of the teeth 30, the springs 42 throw the arms 35 and hammer 29 violently forward and the hammer strikes upon the shank 43 of the drill 44, thus driving the drill into the rock. It will be seen that the rebound of the drill increased by the elastic cams or washers 50 and 51 would naturally cause the frame in which the drill is held to fly backward, but the frame cannot do this by reason of the ratchet teeth 23 and pawls 24, and consequently the rebound causes a second reaction which drives the frame and drill forward, thus bringing the point of the drill again into contact with the rock and effecting its feed. Before the drill is returned to the rock, however, one of the convex surfaces 63 of the double or S-shaped cam 62 will have tilted the levers 59 and 55 and rotated the drill holder and drill, so as to bring the drill into proper position to receive a second blow. This is quickly struck by the hammer 29 and the above operation repeated. It will be seen then that by turning the shaft 32 moderately fast, a rapid succession of powerful blows will be struck upon the drill, the drill will be turned in a proper manner after each blow and will be held up to its work all the time, so that a hole may be rapidly drilled; the operation being substantially like drilling by hand.

It will be seen that the frame and drill may be given any inclination desired so that a hole may be drilled at any angle.

Having thus described my invention, I claim as new and desire to secure by Letters Patent—

1. A rock drill, comprising a portable frame, a drill holder carried by the frame, a reciprocating hammer held to slide between antifriction rollers and adapted to strike upon the drill in the drill holder, spring barrels arranged parallel with the hammer and provided with insulating cushions in the ends, springs arranged in said barrels, arms secured to the hammer and held to slide in slots in the spring barrels, the arms being pressed forward by the springs in said barrels, and a crank and gear mechanism for moving the arms against the tension of the springs in the barrels, substantially as described.

2. A rock drill, comprising a portable track having a breast plate at one end, a frame held to slide on the track and having a ratchet connection therewith which holds it forward thereon, a revoluble drill holder journaled in the frame, a reciprocating hammer held to slide in the frame and strike the drill in the holder, the hammer having a longitudinal row of teeth thereon, a revoluble driving shaft extending at right angles to the hammer, a mutilated gear wheel carried by the shaft and held to mesh with the teeth on the hammer, outwardly extending arms secured to the hammer, and springs arranged to engage the arms and throw the hammer against the drill, substantially as described.

3. The combination with the drill frame, the revoluble drill holder carried by the frame and the ratchet wheel secured to the drill holder, of a revoluble driving shaft arranged to drive a hammer against a drill in the holder, cams secured to the driving shaft, a tilting lever fulcrumed on the side of the frame and operated by the cams, a second spring lever secured to one end of the tilting lever and fulcrumed on the frame, the spring lever extending opposite the ratchet wheel, and a hook pawl secured to the spring lever and arranged to engage the ratchet wheel, substantially as described.

4. In a rock drill, the combination of a tubular track, extension rods fitting the tubes at the front ends thereof, for extending the track, a guard at the rear of the track adjustably held thereto by rods carried by the guard, and a frame adapted to slide on the tubes, and carrying the drilling devices, substantially as described.

HARVEY P. JONES.

Witnesses:
GEO. B. JONES,
F. D. ACKLEY.